United States Patent
Umesh et al.

(10) Patent No.: US 8,050,228 B2
(45) Date of Patent: Nov. 1, 2011

(54) WINDOW CONTROL AND RETRANSMISSION CONTROL METHOD AND TRANSMITTING-SIDE APPARATUS

(75) Inventors: Anil Umesh, Yokohama (JP); Sadayuki Abeta, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 149 days.

(21) Appl. No.: 12/594,901

(22) PCT Filed: Apr. 4, 2008

(86) PCT No.: PCT/JP2008/056815
§ 371 (c)(1),
(2), (4) Date: Jan. 15, 2010

(87) PCT Pub. No.: WO2008/126810
PCT Pub. Date: Oct. 23, 2008

(65) Prior Publication Data
US 2010/0110985 A1    May 6, 2010

(30) Foreign Application Priority Data

Apr. 6, 2007    (JP) ................................. 2007-100742

(51) Int. Cl.
*H04W 4/00* (2009.01)
*H04W 28/00* (2009.01)
(52) U.S. Cl. ........................................ 370/330; 370/341
(58) Field of Classification Search .................. None
See application file for complete search history.

(56) References Cited

U.S. PATENT DOCUMENTS

| | | | | |
|---|---|---|---|---|
| 6,731,623 | B2* | 5/2004 | Lee et al. | 370/349 |
| 7,356,099 | B2* | 4/2008 | Lee | 375/342 |
| 7,509,554 | B2* | 3/2009 | Lohr et al. | 714/748 |
| 7,657,815 | B2* | 2/2010 | Seidel et al. | 714/748 |
| 7,817,605 | B2* | 10/2010 | Liu | 370/337 |
| 7,894,468 | B2* | 2/2011 | Chuah et al. | 370/449 |
| 2002/0001296 | A1* | 1/2002 | Lee et al. | 370/338 |
| 2002/0021698 | A1* | 2/2002 | Lee et al. | 370/394 |

FOREIGN PATENT DOCUMENTS

| | | |
|---|---|---|
| JP | 7-66838 A | 3/1995 |
| JP | 2001-24704 A | 1/2001 |
| JP | 2002-271435 A | 9/2002 |
| JP | 2004-104821 A | 4/2004 |
| JP | 2008-113327 A | 5/2008 |
| JP | 2008259037 A | 10/2008 |

OTHER PUBLICATIONS

Japanese Office Action for Application No. 2007-100742, mailed on Jun. 22, 2010 (5 pages).

(Continued)

*Primary Examiner* — Chi Pham
*Assistant Examiner* — Soon-Dong Hyun
(74) *Attorney, Agent, or Firm* — Osha Liang LLP (57) ABSTRACT

In a retransmission control method, a transmitting-side apparatus manages an acknowledgement information reception window and the transmitting-side apparatus does not perform the window control processing and the retransmission control processing of a packet on the basis of the acknowledgement information for a sequence number of the packet which is included in the acknowledgement information received from the receiving-side apparatus, when the sequence number takes a value outside a range of the acknowledgement information reception window.

6 Claims, 9 Drawing Sheets

OTHER PUBLICATIONS

ASUSTek, "Improvement of RLC Reset Procedure", 3GPP TSG-RAN WG2 #56bis R2-070244, Jan. 2007, URL, http://www.3gpp.org/ftp/tsg_ran/WG2_RL2/TSGR2_56bis/Documents/R2-070244.zip.

International Search Report w/translation from PCT/JP2008/056815 dated Jun. 10, 2008 (5 pages).

Written Opinion from PCT/JP2008/056815 dated Jun. 10, 2008 (5 pages).

Patent Abstracts of Japan; Publication No. 2008-113327 dated May 15, 2008; Matsushita Electric Industrial Co., Ltd. (1 page).

Patent Abstracts of Japan; Publication No. 2001-024704 dated Jan. 26, 2001; Fujitsu Ltd. (1 page).

Patent Abstracts of Japan; Publication No. 07-066838 dated Mar. 10, 1995; Mitsubishi Electric Corp. (1 page).

Patent Abstracts of Japan; Publication No. 2002-271435 dated Sep. 20, 2002; Mitsubishi Electric Corp. (1 page).

Patent Abstracts of Japan; Publication No. 2004-104821 dated Apr. 2, 2004; Immarsat Ltd. (1 page).

3GPP TS 36.300 V8.0.0; "Evolved Universal Terrestrial Radio Access (E-UTRA) and Evolved Universal Terrestrial Radio Access Network (E-UTRAN)"; Mar. 2007 (82 pages).

3GPP TS 25.322, V6.9.0; "Radio Link Control (RLC) protocol specification"; Sep. 2006 (86 pages).

* cited by examiner

STATUS-PDU (NACK)

| | 0 | 1 | 2 | 3 | 4 | 5 | 6 | 7 |
|---|---|---|---|---|---|---|---|---|
| | Type | | | Control PDU Type | | | | Reserve |
| | Selective NACK SN | | | | | | | |
| | Selective NACK First Octet | | | | | | | |
| | Selective NACK Last Octet | | | | | | Reserve | |
| | Selective NACK SN | | | | | | | |
| | Selective NACK First Octet | | | | | | | |
| | Selective NACK Last Octet | | | | | | Reserve | |
| | Selective NACK First Octet | | | | | | | |
| | Selective NACK Last Octet | | | | | | Reserve | |

FIG. 10

WINDOW CONTROL AND RETRANSMISSION CONTROL METHOD AND TRANSMITTING-SIDE APPARATUS

TECHNICAL FIELD

The present invention relates to a window control and retransmission control method in which a transmitting-side apparatus performs window control processing and retransmission control processing of a packet on the basis of acknowledgement information from a receiving-side apparatus, and also relates to a transmitting-side apparatus.

BACKGROUND ART

In 3GPP, which is an organization that sets standards for third generation mobile communications systems, a study collectively termed as LTE (Long Term Evolution) has been conducted for achieving a drastic improvement of transmission speed and reduction of transmission delay in a radio access network (RAN); and formulation of standard specifications of the elemental technologies related to the study has been in progress.

Figure 5:
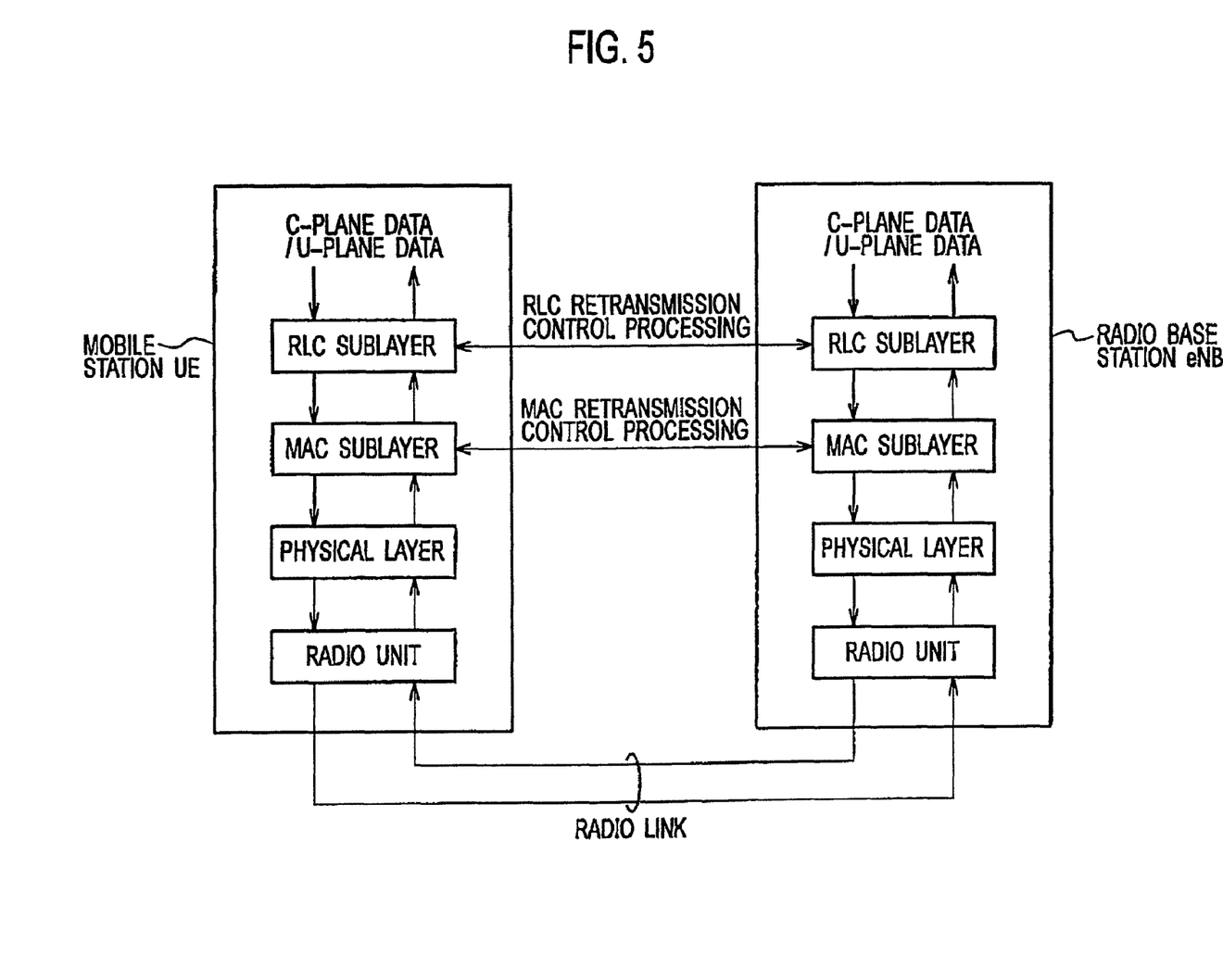
FIG. 5 is a diagram showing a protocol layer configuration in a radio access network of a mobile communication system according to a first embodiment of the present invention.

As shown in FIG. 5, the radio access network (E-UTRAN: Evolved Universal Terrestrial RAN) in an LTE mobile communication system is configured of a mobile station UE (User Equipment) and a radio base station eNB (E-UTRAN Node B). This system is configured in such a way that the mobile station UE and the radio base station eNB communicate with each other via a radio link (RL).

Moreover, each of the mobile station UE and the radio base station eNB is configured to terminate an RLC (Radio Link Control) sublayer, a MAC (Medium Access Control) sublayer and a physical (PHY: Physical) layer.

In addition, a transmitting-side apparatus (mobile station UE or radio base station eNB) is configured to perform RLC processing, MAC processing and PHY processing sequentially for data to be transmitted and then to transmit the data as radio signals from a radio unit.

Meanwhile, a receiving-side apparatus (mobile station UE or radio base station eNB) is configured to extract the transmitted data by performing PHY processing, MAC processing and RLC processing sequentially for the radio signals received by a radio unit. Here, the data to be transmitted includes user data (U-plane data) generated by an application or the like used by the user, and control data (C-plane data) used in controlling the mobile communication system, such as RRC (Radio Resource Control) signaling and NAS (Non Access Stratum) signaling.

Moreover, this system is configured in such a way that RLC retransmission control processing is performed between the RLC sublayer of the transmitting-side apparatus and the RLC sublayer of the receiving-side apparatus, and that HARQ (Hybrid Automatic Repeat Request) retransmission control processing (MAC retransmission control processing) is performed between the MAC sublayer of the transmitting-side apparatus and the MAC sublayer of the receiving-side apparatus.

Hereinafter, with reference to FIG. 1, a description will be given of window control and retransmission control processing in the RLC sublayer of the transmitting-side apparatus on the basis of acknowledgement information from the RLC sublayer of the receiving-side apparatus.

Figure 1:
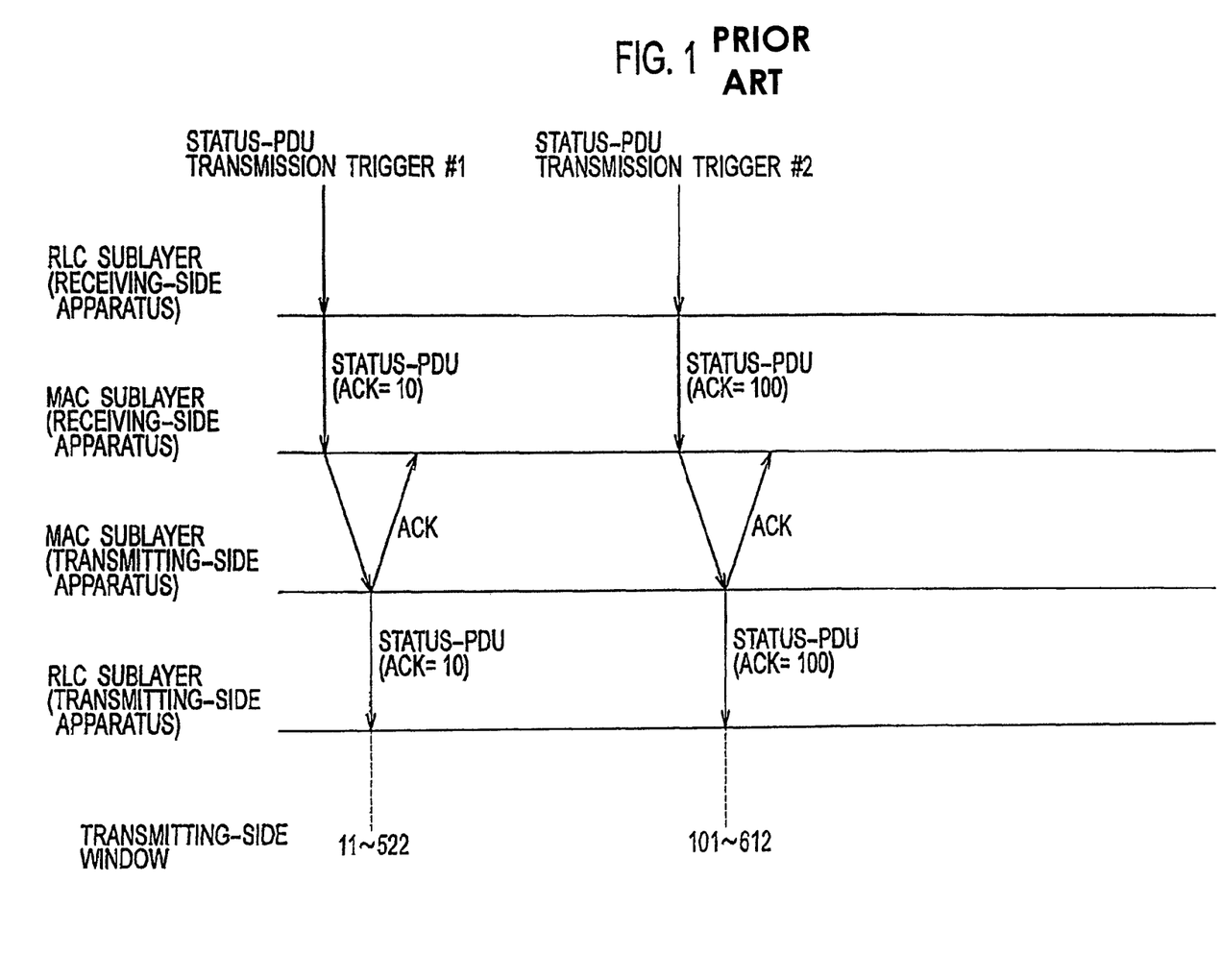
FIG. 1 is a sequence diagram showing operations of the LTE mobile communication system.

As shown in FIG. 1, when a transmission trigger #1 of a STATUS-PDU (acknowledgement information) occurs, firstly, the RLC sublayer of the receiving-side apparatus transmits a STATUS-PDU (ACK=10) to the MAC sublayer of the receiving-side apparatus in accordance with a current RLC-data-PDU reception state, the STATUS-PDU being for notifying an RLC-data-PDU expected to be received next.

Here, the RLC sublayer of the receiving-side apparatus is configured to transmit the STATUS-PDU (ACK=10) in a state where an RLC-data-PDU with a sequence number #10 is received without detection of a loss.

Secondly, the MAC sublayer of the receiving-side apparatus transmits the STATUS-PDU (ACK=10) to the MAC sublayer of the transmitting-side apparatus by using HARQ retransmission control processing.

Thirdly, the RLC sublayer of the transmitting-side apparatus updates the lower limit value and the upper limit value of a transmitting-side window to "11" and "522", respectively, in accordance with the STATUS-PDU (ACK=10) received from the MAC sublayer of the transmitting-side apparatus. Here, the window size of the transmitting-side window is assumed to be "512".

Moreover, since the lower limit value of an acknowledgement information reception window managed by the RLC sublayer of the transmitting-side apparatus is equal to the lower limit value of the transmitting-side window, the RLC sublayer of the transmitting-side apparatus updates the lower limit value of the acknowledgement information reception window to "11" as well in accordance with the STATUS-PDU (ACK=10) received from the MAC sublayer of the transmitting-side apparatus.

On the other hand, the upper limit value of the acknowledgement information reception window managed by the RLC sublayer of the transmitting-side apparatus is set to a value of the latest sequence number of a packet transmitted to the MAC sublayer from the RLC sublayer in the transmitting-side apparatus. Thus, the RLC sublayer of the transmitting-side apparatus does not update the upper limit of the acknowledgement information reception window even when receiving the STATUS-PDU (ACK=10).

Next, when a transmission trigger #2 of a STATUS-PDU (ACK=100) occurs, the aforementioned mobile communication system operates in the same manner, and the lower limit value and the upper limit value of the transmitting-side widow are updated to "101" and "612", respectively. Furthermore, the lower limit value of the acknowledgement information reception widow managed by the RLC sublayer of the transmitting-side apparatus is updated to "101".

Figure 2:
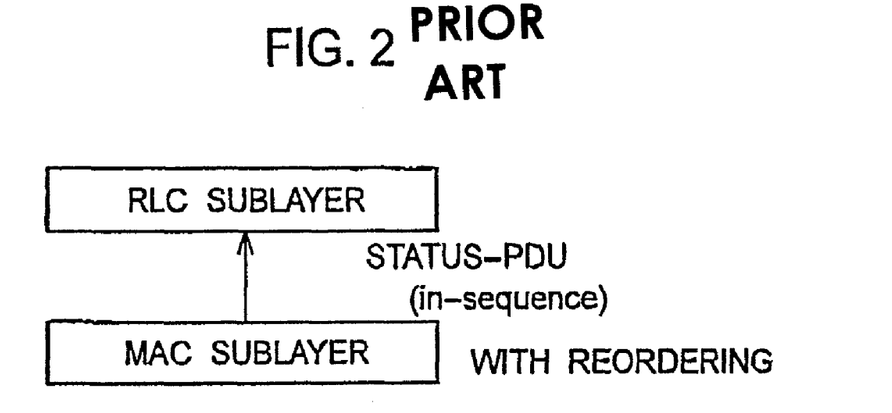
FIG. 2 is a diagram for describing communications between a MAC sublayer and an RLC sublayer in the IMT-2000 mobile communication system.

Here, in an IMT-2000 mobile communication system, as shown in FIG. 2, the transmitting-side apparatus is configured in such a manner that the MAC sublayer performs reordering processing for received RLC-PDUs (actually, MAC-PDUs to which the RLC-PDUs are mapped) including STATUS-PDUs (acknowledgement information), and then transmits the STATUS-PDUs (acknowledgement information) in the order of the sequence numbers to the RLC sublayer.

Accordingly, when the communication state is normal, the sequence number of a packet included in the STATUS-PDU (acknowledgement information) received by the RLC sublayer of the transmitting-side apparatus is always assured to be a value within the range of the acknowledgement information reception window managed by the RLC sublayer of the transmitting-side apparatus.

Then, if the sequence number of a packet included in a STATUS-PDU (acknowledgement information) received by the RLC sublayer of the transmitting-side apparatus takes a value outside the range of the acknowledgement information reception window managed by the RLC sublayer of the transmitting-side apparatus, the RLC sublayer of the transmitting-side apparatus determines that the communication state is abnormal and thus initiates RLC reset processing.

Here, since the RLC sublayer of the transmitting-side apparatus does not transmit an RLC-PDU (data packet) until the RLC reset processing is completed, it is to be noted that initiation of the RLC reset processing notably degrades the communication quality.

Non-Patent Document 1: RLC Specification of IMT-2000: 3GPP TS 25.322 V6.9.0 (2006-09)

Non-Patent Document 2: LTE Stage 2 Specification: 3GPP TS 36.300 V8.0.0 (2007-03)

DISCLOSURE OF THE INVENTION

Figure 3:
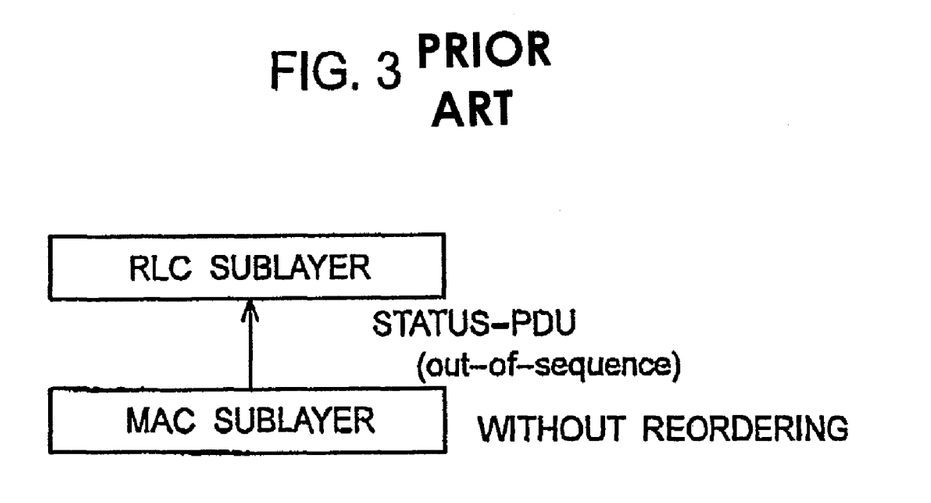
FIG. 3 is a diagram for describing communications between a MAC sublayer and an RLC sublayer in the LTE mobile communication system.

However, in the LTE mobile communication system, as shown in FIG. 3, the MAC sublayer in the transmitting-side apparatus is configured to transmit STATUS-PDUs (acknowledgement information) to the RLC sublayer without performing the reordering processing for received RLC-PDUs including the STATUS-PDUs (acknowledgement information).

Figure 4:
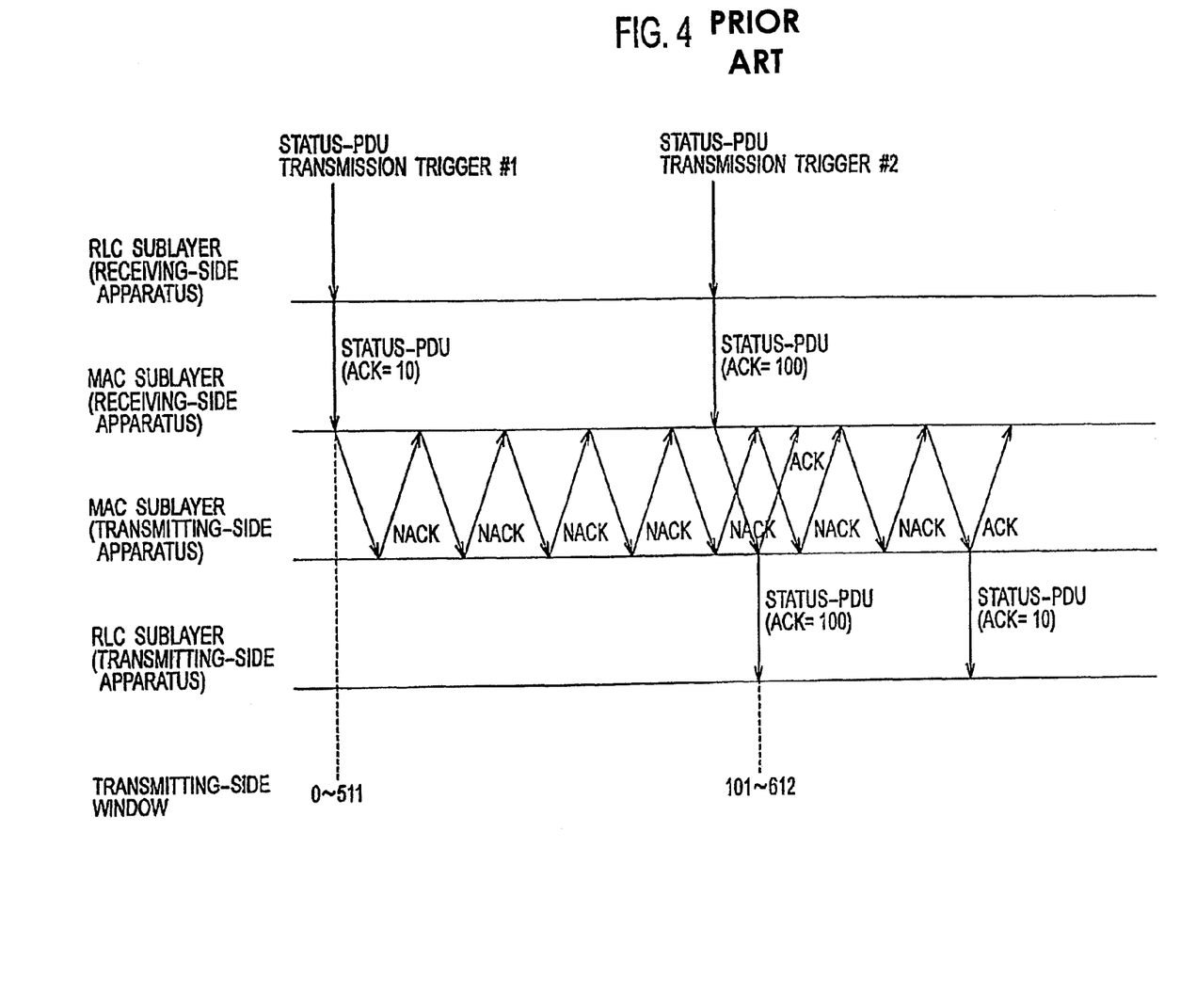
FIG. 4 is a sequence diagram showing operations of the LTE mobile communication system.

Accordingly, in the LTE mobile communication system, as shown in FIG. 4, even when the communication state is normal, there is a case where the STATUS-PDU (ACK=10) transmitted at the occurrence of the transmission trigger #1 of the STATUS-PDU (acknowledgement information) arrives at the RLC sublayer of the transmitting-side apparatus later than the STATUS-PDU (ACK=100) transmitted at the occurrence of a transmission trigger #2 of the STATUS-PDU (acknowledgement information). Such a case occurs because retransmission of the STATUS-PDU (ACK=10) is repeated between the MAC sublayers.

In this case, if the same processing as that in the IMT-2000 mobile communication system is performed, the RLC sublayer of the transmitting side apparatus has the following problem. When the RLC sublayer of the transmitting-side apparatus receives the STATUS-PDU (ACK=10) generated in an older reception state than a reception state when the STATUS-PDU (ACK=100) is generated, after updating the lower limit value of the transmitting-side window (that is, the lower limit value of the acknowledgement information reception window) to "101" in accordance with the STATUS-PDU (ACK=100), the sequence number of the packet included in the aforementioned STATUS-PDU (ACK=10) takes a value outside the range of the acknowledgement information reception window. As a result, the RLC sublayer of the transmitting-side apparatus initiates the RLC reset processing, thereby notably degrading the communication quality.

In this respect, the present invention has been made in view of the aforementioned problem. An object of the present invention is to provide a window control and retransmission control method and a transmitting-side apparatus that enable prevention of deterioration of a communication quality by avoiding initiation of the RLC reset processing in the transmitting-side apparatus in a case where a MAC sublayer does not perform reordering processing for received STATUS-PDUs.

A first aspect of the present invention is summarized as a window control and retransmission control method in which a transmitting-side apparatus performs window control processing and retransmission control processing of a packet on the basis of acknowledgement information including an acknowledgement response or a retransmission request from a receiving-side apparatus, including steps of: managing, at the transmitting-side apparatus, an acknowledgement information reception window; and not performing, at the transmitting-side apparatus, the window control processing and the retransmission control processing of a packet on the basis of the acknowledgement information for a sequence number of the packet which is included in the acknowledgement information received from the receiving-side apparatus, when the sequence number takes a value outside a range of the acknowledgement information reception window.

In the first aspect, a lower limit value of the acknowledgement information reception window can be the oldest sequence number of a packet for which an acknowledgement response from the receiving-side apparatus is expected in the transmitting-side apparatus.

In the first aspect, an upper limit value of the acknowledgement information reception window can be the latest sequence number of a packet transmitted to a lower layer than a predetermined sublayer that performs the window control processing and the retransmission control processing in the transmitting-side apparatus.

A second aspect of the present invention is summarized as a transmitting-side apparatus configured to perform window control processing and retransmission control processing of a packet on the basis of acknowledgement information including an acknowledgement response or a retransmission request from a receiving-side apparatus, wherein the transmitting-side apparatus is configured to manage an acknowledgement information reception window; and the transmitting side apparatus is configured not to perform the window control processing and the retransmission control processing of a packet on the basis of the acknowledgement information for a sequence number of the packet which is included in the acknowledgement information received from the receiving-side apparatus, when the sequence number is a value outside a range of the acknowledgement information reception window.

In the second aspect, a lower limit value of the acknowledgement information reception window can be the oldest sequence number of a packet for which an acknowledgement response from the receiving-side apparatus is expected in the transmitting-side apparatus.

In the second aspect, an upper limit value of the acknowledgement information reception window can be the latest sequence number of a packet transmitted to a lower layer than a predetermined sublayer that performs the window control processing and the retransmission control processing in the transmitting-side apparatus.

As described above, according to the present invention, it is possible to provide a window control and retransmission control method and a transmitting-side apparatus that enable prevention of deterioration of a communication quality by avoiding initiation of the RLC reset processing in the transmitting-side apparatus in a case where a MAC sublayer does not perform reordering processing for received STATUS-PDUs.

BEST MODE FOR CARRYING OUT THE INVENTION

Configuration of Mobile Communication System According to First Embodiment of the Present Invention A description will be given of a configuration of a mobile communication system according to a first embodiment of the present invention with reference to FIGS. 5 to 8.

Note that, in this embodiment, the description will be given of a mobile communication system including an LTE/SAE (System Architecture Evolution) architecture for which standardization by 3GPP has been in progress, as an example, as shown in FIG. 5, but the present invention is not limited to the mobile communication system, and is applicable to a mobile communication system including another architecture.

A description will be given of a functional configuration of an RLC sublayer of Acknowledge mode (AM) (hereinafter, referred to as RLC sublayer) with reference to FIG. 6.

Figure 6:
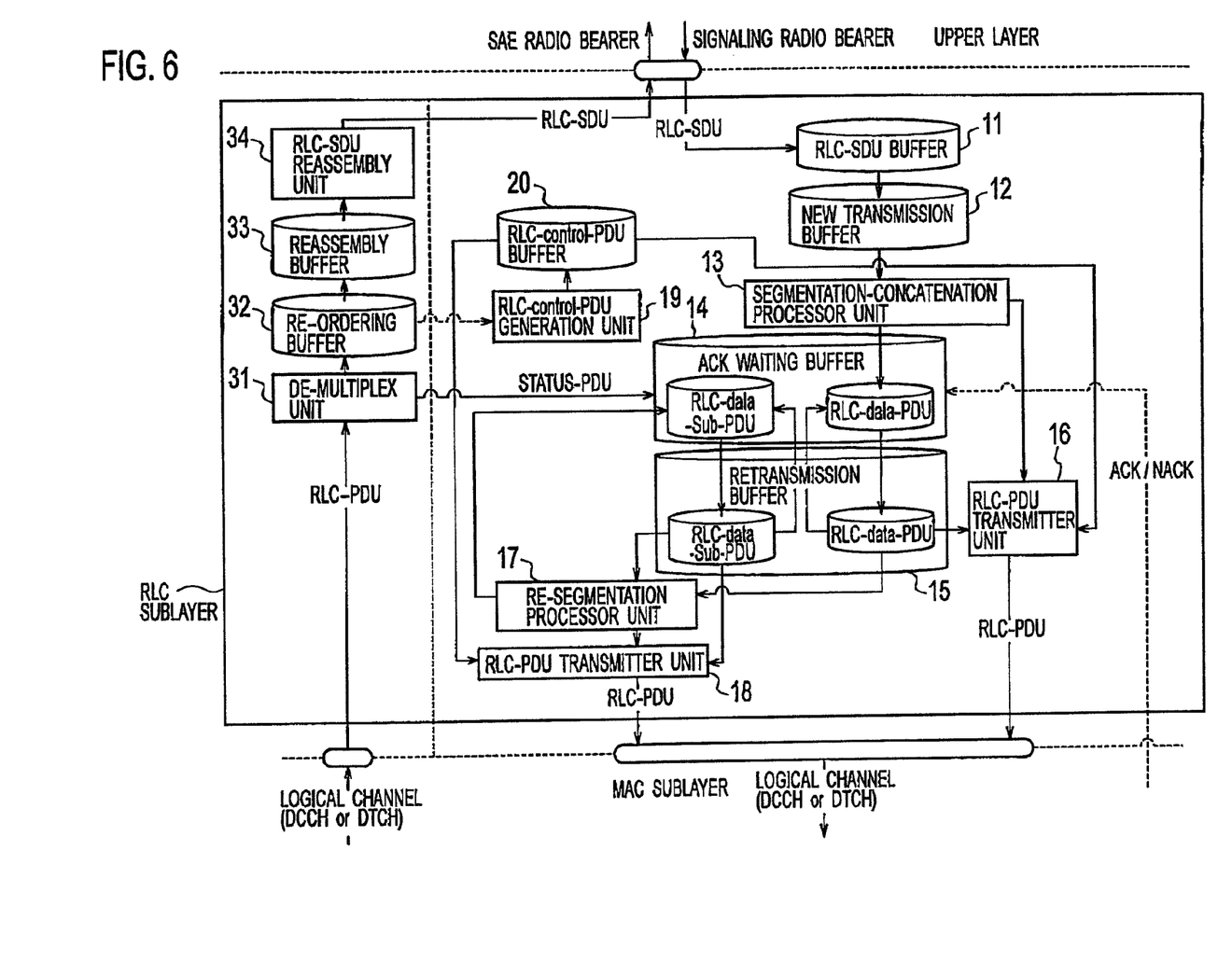
FIG. 6 is a functional block diagram of an RLC sublayer in a mobile station and a radio base station according to the first embodiment of the present invention.

Note that, a part of or all of the functions (modules) constituting the RLC sublayer shown in FIG. 6 may be implemented by hardware or software on an IC chip.

For example, on an IC chip, functions (modules) constituting a MAC sublayer and a physical layer for which simple and high speed processing is generally required may be configured to be implemented by hardware, and functions (modules) constituting the RLC sublayer for which complex processing is generally required may be configured to be implemented by software.

In addition, a function (module) constituting the physical layer, a function (module) constituting the MAC sublayer and a function (module) constituting the RLC sublayer may be implemented on the same IC chip, or may be implemented on different IC chips, respectively.

Hereinafter, an example of a configuration of the RLC sublayer in the mobile communication system according to this embodiment will be shown with reference to FIG. 6.

As shown in FIG. 6, the RLC sublayer includes an RLC-SDU buffer 11, a new transmission buffer 12, a segmentation-concatenation processor unit 13, an ACK waiting buffer 14, a retransmission buffer 15, an RLC-PDU transmitter unit 16, a re-segmentation processor unit 17, an RLC-PDU transmitter unit 18, an RLC-control-PDU generation unit 19, an RLC-control-PDU buffer 20, a de-multiplex unit 31, a reordering buffer 32, a reassembly buffer 33 and an RLC-SDU reassembly unit 34.

The RLC-SDU buffer 11 is configured to store an RLC-SDU received from an upper layer therein.

The new transmission buffer 12 is configured to copy the RLC-SDU stored in the RLC-SDU buffer 11 and then to store the RLC-SDU therein.

The segmentation-concatenation processor unit 13 is configured to perform segmentation processing or concatenation processing for the RLC-SDU (or a part thereof) stored in the new transmission buffer 12, and thereby to generate an RLC-data-PDU whose size becomes the largest within a range of an allowable amount of transmission data notified from a MAC sublayer along with a notification, in a case where a data transmission event is notified by the MAC sublayer.

In addition, the segmentation-concatenation processor unit 13 is configured to transmit the generated RLC-data-PDU to the RLC-PDU transmitter unit 16, and also to cause the generated RLC-data-PDU to be stored in the ACK waiting buffer 14.

The ACK waiting buffer 14 is configured to store, therein, the RLC-data-PDU from the segmentation-concatenation processor unit 13, an RLC-data-PDU or an RLC-data-Sub-PDU from the retransmission buffer 15, and an RLC-data-Sub-PDU from the re-segmentation processor unit 17.

The ACK waiting buffer 14 is configured to determine whether or not retransmission for the stored RLC-data-PDU or RLC-data-Sub-PDU is necessary, and to transmit, to the retransmission buffer 15, the RLC-data-PDU or RLC-data-Sub-PDU for which a determination is made that retransmission thereof is necessary.

Here, for example, the ACK waiting buffer 14 determines whether or not it is necessary for the stored RLC-data-PDU or RLC-data-Sub-PDU to be retransmitted, in a case where a STATUS-PDU (NACK) from the RLC sublayer and in a case where a NACK from the MAC sublayer of the receiving-side apparatus are received.

Figure 8:
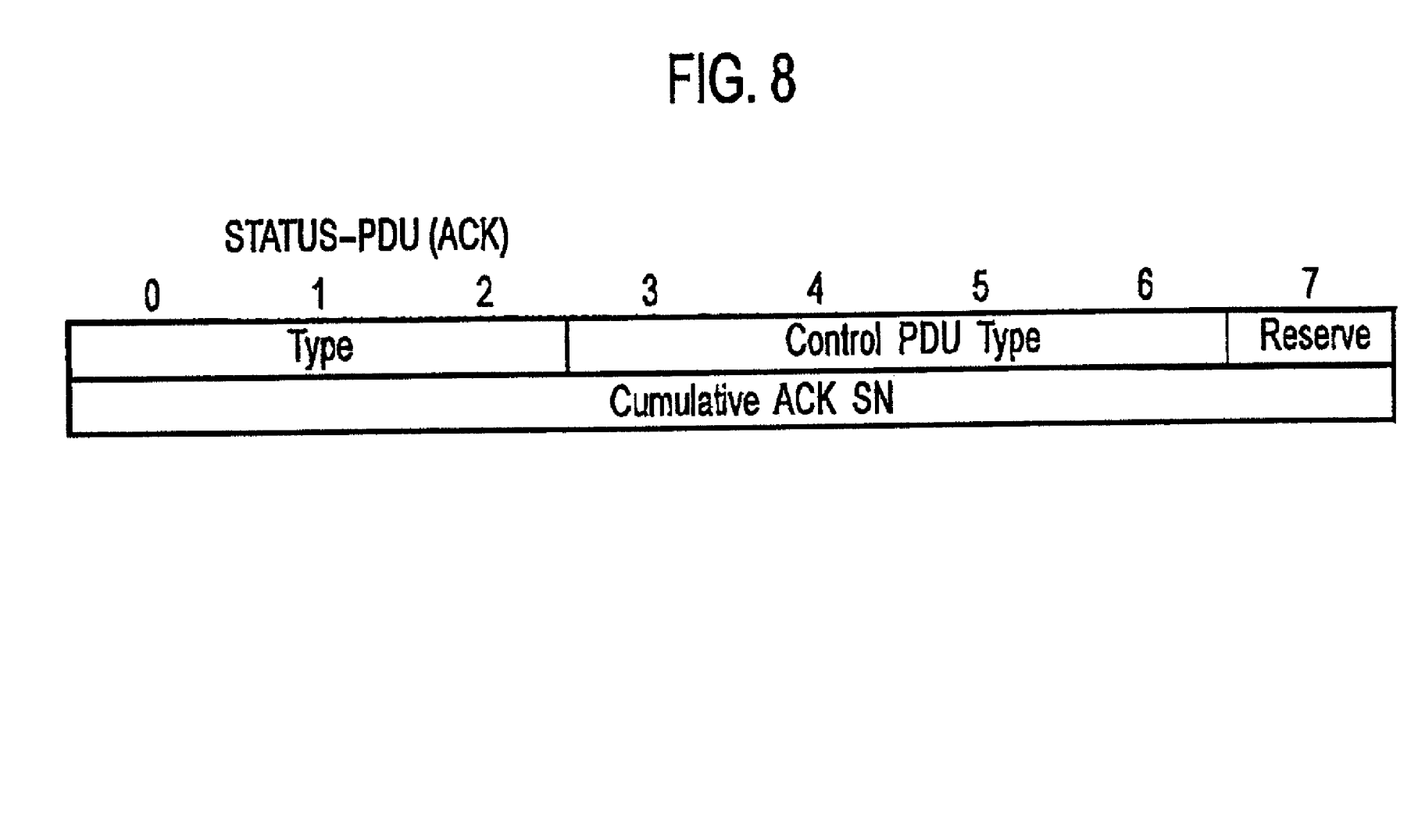
FIG. 8 is a diagram showing an example of a format of a STATUS-PDU (ACK) to be generated by an RLC sublayer in a mobile station and a radio base station according to the first embodiment of the present invention.

In FIG. 8, a format example of a STATUS-PDU (ACK) used in the mobile communication system according to the present embodiment is shown.

As shown in FIG. 8, the STATUS-PDU (ACK) includes a "Type" field, a "Control PDU Type" field, and a "Comulative ACK SN" field.

The "Type" field is a field showing a type of the RLC-PDU (for example, STATUS-PDU).

The "Control PDU Type" field is a field showing a type (STATUS-PDU (ACK), STATUS-PDU (NACK) or the like) of the RLC-control-PDU.

The "Cumulative ACK SN" field shows a field indicating the value of "the lower limit value −1" of the receiving-side window managed by the RLC sublayer of the receiving-side apparatus.

Figure 9:
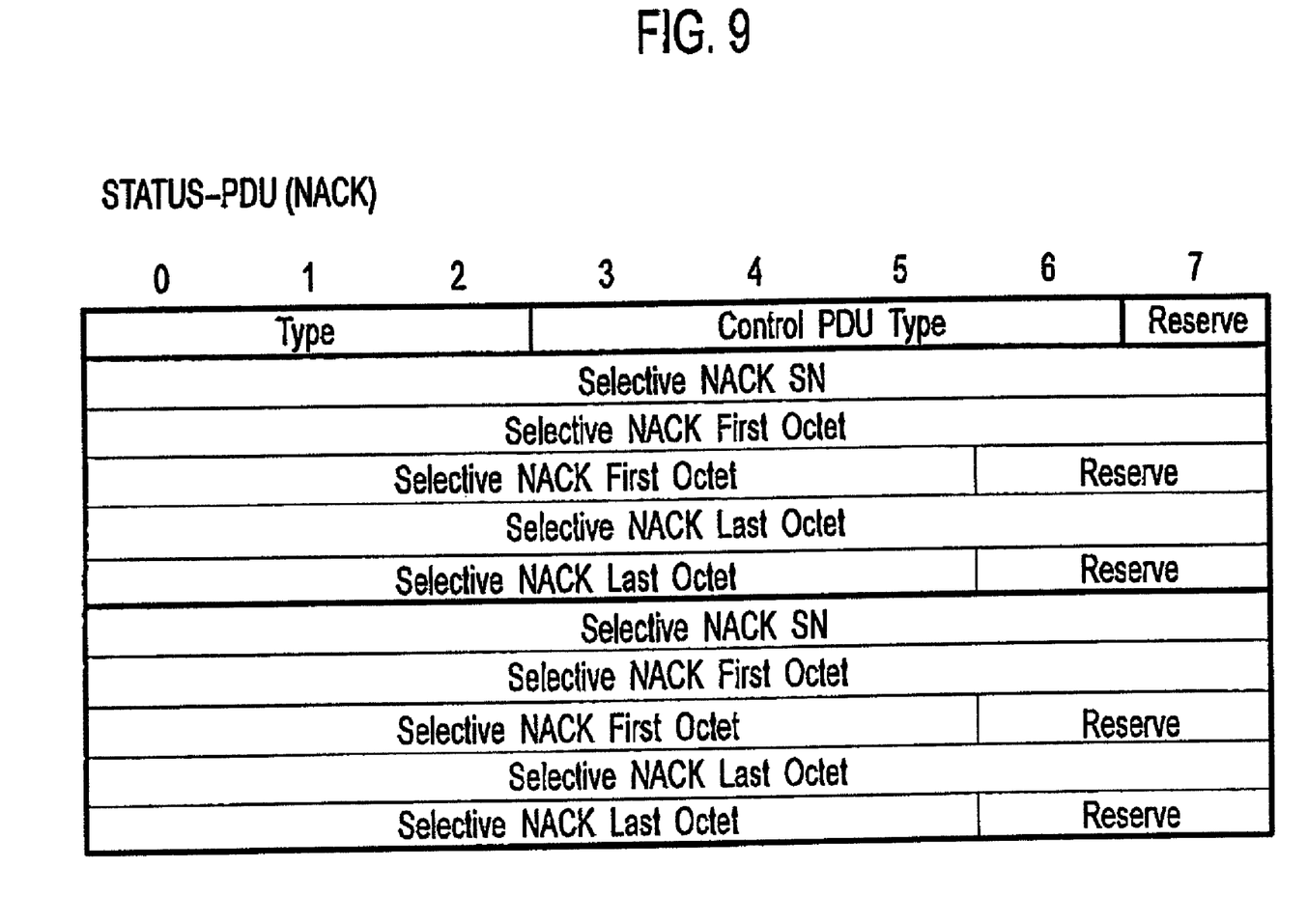
FIG. 9 is a diagram showing an example of a format of a STATUS-PDU (NACK) to be generated by an RLC sublayer in a mobile station and a radio base station according to the first embodiment of the present invention.

In FIG. 9, a format example of a STATUS-PDU (NACK) used in the mobile communication system according to the present embodiment is shown.

As shown in FIG. 9, the STATUS-PDU (NACK) includes a "Type" field, a "Control PDU Type" field, a "Selective NACK SN" field, a "Selective NACK First Octet" field and a "Selective NACK Last Octet" field.

Here, a payload portion of the STATUS-PDU (NACK) may include multiple sets of "Selective NACK SN" fields, "Selective NACK First Octet" fields and "Selective NACK Last Octet" fields.

The "Selective NACK SN" field is a field showing the sequence number of the RLC-data-PDU, the RLC retransmission of which is determined to be necessary in the receiving-side window managed by the RLC sublayer of the receiving-side apparatus.

The "Selective NACK First Octet" field is a field showing that from which byte (octet) in the RLC-data-PDU specified by the "Selective NACK SN" field needs to be retransmitted.

The "Selective NACK Last Octet" field is a field showing that up to which byte (octet) in the RLC-data-PDU specified by the "Selective NACK SN" field needs to be retransmitted.

The ACK waiting buffer 14 is configured to manage a transmitting-side window and an acknowledgement information reception window.

Specifically, the ACK waiting buffer 14 manages the transmitting-side window and the acknowledgement information reception window defined by state variables "Window_Size", "VT (A)", "VT (S)" and "VT (MS)".

Here, "Window_Size" is a value common between the RLC sublayer of the transmitting-side apparatus and the RLC sublayer of the receiving-side apparatus, and shows the maximum number of transmittable RLC-PDUs without receiving a STATUS-PDU (ACK) from the RLC sublayer of the receiving-side apparatus.

"VT (A)" shows the lower limit value of the transmitting-side window and the acknowledgement information reception window, that is, the value of the oldest sequence number of the RLC-data-PDU (packet) whose STATUS-PDU (ACK) from the RLC sublayer of the receiving-side apparatus is expected.

"VT (S)" shows the value of the next sequence number to be assigned to an RLC-data-PDU (packet) to be newly transmitted to the MAC sublayer from the RLC sublayer in the transmitting-side apparatus.

Specifically, "VT (S) −1" shows the value of the latest sequence number of the RLC-PDU (packet) transmitted to the MAC sublayer from the RLC sublayer in the transmitting-side apparatus, and shows the upper limit value of the acknowledgement information reception window.

"VT (MS)" shows "the upper limit value +1" of the transmitting-side window, that is, the sum of "VT (A)" and "Window_Size".

Basically, the ACK waiting buffer 14 is configured to update the transmitting-side window and the acknowledgement information reception window (state variables) on the basis of the sequence number of the RLC-data-PDU included in the STATUS-PDU (ACK) received from the RLC sublayer of the receiving-side apparatus.

However, in a case where the sequence number of the RLC-data-PDU included in a STATUS-PDU (ACK/NACK) received from the RLC sublayer of the receiving-side apparatus is not a value ("VT (A)"≦sequence number≦"VT (S)−1") within the range of the acknowledgement information reception window, the ACK waiting buffer 14 ignores the STATUS-PDU (ACK/NACK) for the sequence number. In other words, the ACK waiting buffer 14 is configured not to perform the window control processing and the retransmission control processing on the basis of the STATUS-PDU (ACK/NACK) for the sequence number.

Specifically, the ACK waiting buffer 14 is configured to ignore the acknowledgement response or retransmission request included in the STATUS-PDU (ACK/NACK), and neither to update the state variables of the transmitting-side window nor the acknowledgement information reception window, nor to perform retransmission of the applicable RLC-data-PDU in the following case. The case is where the ACK waiting buffer 14 determines that the sequence number of the RLC-data-PDU included in the STATUS-PDU (ACK/NACK) received from the RLC sublayer of the receiving-side apparatus is outside the range of the acknowledgement information reception window.

Note that, the ACK waiting buffer 14 is configured to ignore, when an RLC-data-Sub-PDU is specified by the received STATUS-PDU (ACK/NACK), the acknowledgement response or retransmission request included in the STATUS-PDU (ACK/NACK), and neither to update the state variables of the transmitting-side window nor the acknowledgement information reception window, nor to perform retransmission of the applicable RLC-data-Sub-PDU in the following case. The case is where the sequence number of the RLC-data-PDU to which the RLC-data-Sub-PDU belongs is determined to be outside the range of the acknowledgement information reception window.

The retransmission buffer 15 is configured to store an RLC-data-PDU or an RLC-data-Sub-PDU from the ACK waiting buffer 14 therein.

The RLC-PDU transmitter unit 16 is configured to transmit, to the MAC sublayer, the RLC-data-PDU transmitted from the segmentation-concatenation processor unit 13 and the RLC-data-PDU stored in the retransmission buffer 15, in a case where a data transmission event is notified from the MAC sublayer.

Here, the RLC-PDU transmitter unit 16 may be configured to generate an RLC-data-PDU-piggybacked-control-PDU, by adding the RLC-control-PDU (STATUS-PDU or the like) stored in the RLC-control-PDU buffer 20 to the RLC-data-PDU to be transmitted, and then to transmit the RLC-data-PDU-piggybacked-control-PDU.

In addition, the RLC-PDU transmitter unit 16 is configured to assign a new sequence number ("VT (S)") to an RLC-data-PDU when generating the RLC-data-PDU to be transmitted.

Note that, the RLC-PDU transmitter unit 16 cannot generate an RLC-data-PDU to which a sequence number (not less than "VT (MS)") larger than the upper limit value of the transmitting-side window is added.

The re-segmentation processor unit 17 is configured to generate multiple RLC-data-Sub-PDUs by segmenting one RLC-data-PDU or RLC-data-Sub-PDU stored in the retransmission buffer 15 in accordance with the communication state of the radio link, that is, in accordance with the allowable amount of transmission data notified by the MAC layer along with the notification. Specifically, the re-segmentation processor unit 17 is configured to perform re-segmentation processing for the RLC-data-PDU or the RLC-data-Sub-PDU stored in the retransmission buffer 15.

Figure 7:
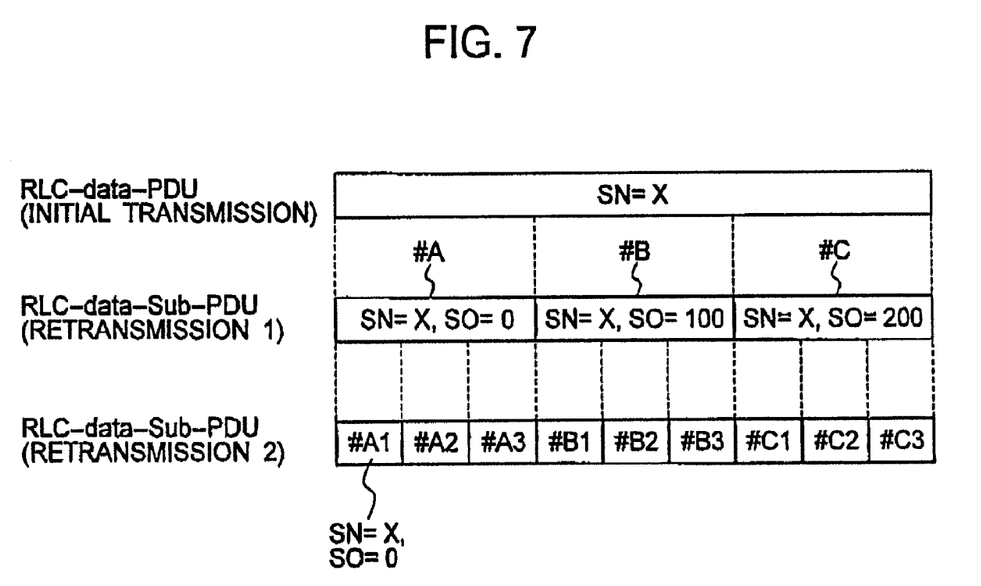
FIG. 7 is a diagram for describing re-segmentation processing to be performed in the RLC sublayer in a mobile station and a radio base station according to the first embodiment of the present invention.

In an example in FIG. 7, the re-segmentation processor unit 17 segments an RLC-data-PDU (SN=x) into three RLC-data-Sub-PDUs #A to #C at the first retransmission, and segments the three RLC-data-Sub-PDUs #A to #C into three RLC-data-Sub-PDUs #A1 to #A3, #B1 to #B3 and #C1 to #C3, respectively.

The RLC-PDU transmitter unit 18 is configured to transmit, to the MAC sublayer, the RLC-data-Sub-PDU that has been subjected to the re-segmentation processing by the re-segmentation processor unit 17, in a case where a data transmission event is notified from the MAC sublayer.

Here, the RLC-PDU transmitter unit 18 may be configured to generate an RLC-data-Sub-PDU-piggybacked-control-PDU by adding the RLC-control-PDU (STATUS-PDU or the like) stored in the RLC-control-PDU buffer 20 to the RLC-data-Sub-PDU to be transmitted, and to transmit the RLC-data-Sub-PDU-piggybacked-control-PDU.

The RLC-control-PDU generation unit 19 is configured to generate a STATUS-PDU (ACK/NACK) in accordance with a notification from the reordering buffer 32.

The RLC-control-PDU buffer 20 is configured to store the RLC-control-PDU generated by the RLC-control-PDU generation unit 19.

The de-multiplex unit 31 is configured to extract a STATUS-PDU from the RLC-PDU received from the MAC sublayer, and then to forward the STATUS-PDU to the ACK waiting buffer 14, and also to extract and then to forward an RLC-data-PDU and an RLC-data-Sub-PDU to the reordering buffer 32.

The reordering buffer 32 is configured to perform the reordering processing for the stored RLC-data-PDU (or RLC-data-Sub-PDU).

Specifically, the reordering buffer 32 is configured to cause RLC-data-PDUs (in-sequence) stored in the order of the sequence numbers to be stored in the reassembly buffer 33.

Meanwhile, the reordering buffer 32 is configured to perform RLC-data-PDU loss detection processing using an reordering timer for an RLC-data-PDU (out-of-sequence) not stored in the order of the sequence numbers. The reordering buffer 32 is configured to notify the RLC-control-PDU generation unit 19 that a loss is detected for an unreceived RLC-PDU, in a case where such a loss is detected.

The reordering buffer 32 is configured to assemble an RLC-data-PDU, in a case where the RLC-data-PDU can be assembled from stored RLC-data-Sub-PDUs.

The RLC-SDU reassembly unit 34 is configured to assemble and then to transmit RLC-SDUs to an upper layer in the order of the sequence numbers, in a case where the RLC-SDUs can be assembled from the RLC-data-PDUs stored in the reassembly buffer 33.

Operations of Mobile Communication System According to the First Embodiment of the Present Invention A description will be given of operations of the transmitting-side apparatus in the mobile communication system according to the first embodiment of the present invention with reference to FIG. 10.

Figure 10:
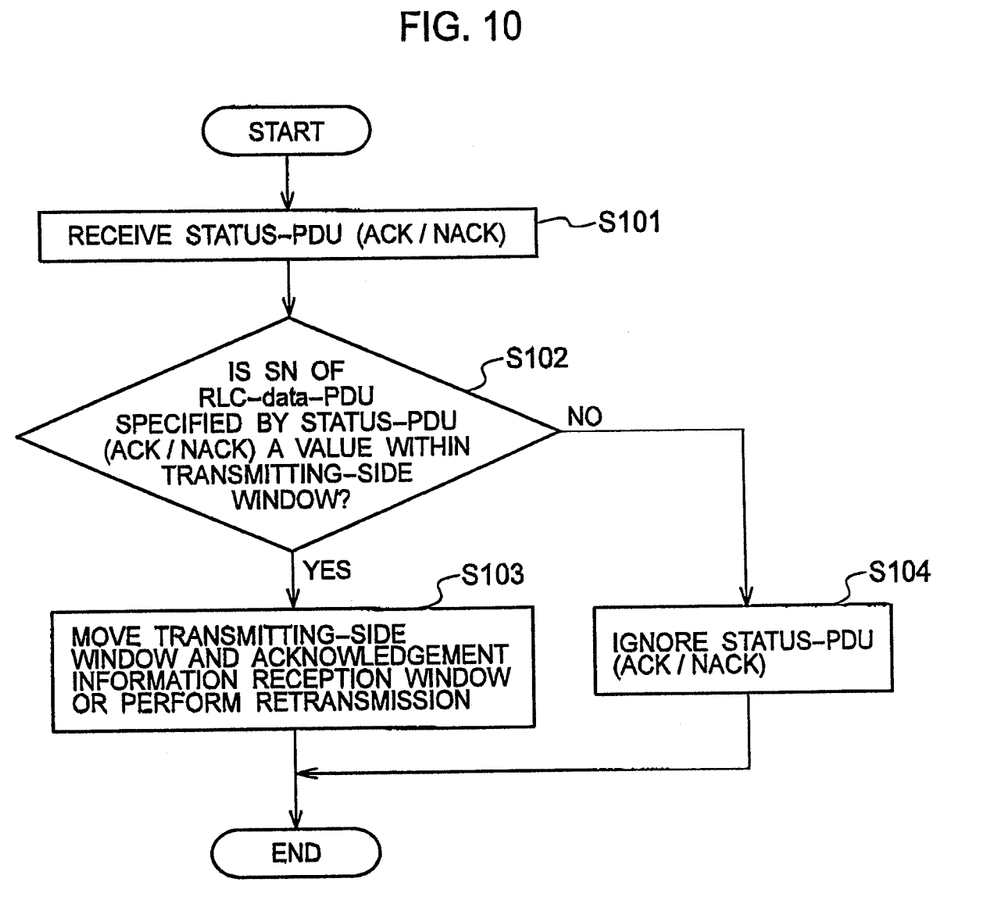
FIG. 10 is a flowchart showing an operation of an RLC sublayer in a mobile station and a radio base station according to the first embodiment of the present invention.

As shown in FIG. 10, in step S101, the RLC sublayer of the transmitting-side apparatus receives a STATUS-PDU (ACK/NACK) from the RLC sublayer of the receiving-side apparatus.

In step S102, the RLC sublayer of the transmitting-side apparatus determines whether or not the sequence number of the RLC-data-PDU specified by the received STATUS-PDU (ACK/NACK) is a value within the acknowledgement information reception window.

Note that, in a case where an RLC-data-Sub-PDU is specified by the received STATUS-PDU (ACK/NACK), the RLC sublayer of the transmitting-side apparatus determines whether or not the sequence number of the RLC-data-PDU to which the RLC-data-Sub-PDU belongs is a value within the acknowledgement information reception window.

In a case where the sequence number of the RLC-data-PDU specified by the received STATUS-PDU (ACK) is determined to be a value within the acknowledgement information reception window, in step S103, the RLC sublayer of the transmitting-side apparatus moves the transmitting-side window and the acknowledgement information reception window, that is, updates the state variables in the transmitting-side window and the acknowledgement information reception window, if necessary (the sequence number of the RLC-data-PDU specified by the STATUS-PDU (ACK) is the lower limit value of the transmitting-side window).

In addition, in a case where the sequence number of the RLC-data-PDU specified by the received STATUS-PDU (NACK) is determined to be a value within the acknowledgement information reception window, the RLC sublayer of the transmitting-side apparatus retransmits the RLC-data-PDU in step S103.

On the other hand, in a case where the sequence number of the RLC-PDU specified by the received STATUS-PDU (ACK/NACK) is determined to be a value outside the acknowledgement information reception window, in step S104, the RLC sublayer of the transmitting-side apparatus ignores the STATUS-PDU (ACK/NACK), that is, does not perform the window control processing and the retransmission control processing of the packet on the basis of the STATUS-PDU (ACK/NACK).

Effects and Advantages of the Mobile Communication System According to the First Embodiment of the Present Invention With the mobile communication system according to the first embodiment of the present invention, as shown in FIG. 1, it is possible to prevent deterioration of a communication quality by avoiding the initiation of the RLC reset processing in the transmitting-side apparatus by ignoring the STATUS-PDU (ACK=10) in the following case. The case is where the STATUS-PDU (ACK=10) transmitted at the occurrence of the transmission trigger #1 of the STATUS-PDU arrives at the RLC sublayer of the transmitting-side apparatus later than the STATUS-PDU (ACK=100) transmitted at the occurrence of the transmission trigger #2 of the STATUS-PDU because retransmission of the STATUS-PDU (ACK=10) is repeated between the MAC sublayers.

The present invention has been described above by using the aforementioned embodiments. However, it is obvious to those skilled in the art that the present invention is not limited to the embodiments described in this description. The present invention can be implemented as a revised and modified form without departing from the spirit and scope of the present invention, which are defined by the appended claims. Thus, the contents of this description aim to describe the exemplification and not to impose any limitation on the present invention.

Note that, the entire contents of Japanese Patent Application No. 2007-101742 (filed on Apr. 6, 2007) are incorporated in this description by reference.

INDUSTRIAL APPLICABILITY

As described above, the window control and retransmission control method and the transmitting-side apparatus according to the present invention are advantageous since they make it possible to prevent deterioration of a communication quality by avoiding the initiation of the RLC reset processing in the transmitting-side apparatus in a case where a MAC sublayer does not perform reordering processing for received STATUS-PDUs.

The invention claimed is:

1. A window control and retransmission control method in which a radio link control (RLC) sublayer of a transmitting-side apparatus performs window control processing and retransmission control processing of a packet on the basis of positive/negative acknowledgement information (STATUS-PDU) received from a receiving-side apparatus, comprising steps of:

managing, at the RLC sublayer of the transmitting-side apparatus, an acknowledgement information reception window;

transmitting, from a medium access control (MAC) sublayer of the transmitting-side apparatus, to the RLC sublayer of the transmitting-side apparatus, an RLC-PDU including the STATUS-PDU received from the receiving-side apparatus, without performing a reordering processing for the RLC-PDU; and avoiding, at the RLC sublayer of the transmitting-side apparatus, an initiation of an RLC reset processing, by ignoring a sequence number of the RLC-PDU included in the STATUS-PDU received from the MAC sublayer of the transmitting-side apparatus, when the sequence number takes a value outside a range of the acknowledgement information reception window.

2. The window control and retransmission control method according to claim 1, wherein a lower limit value of the acknowledgement information reception window is the oldest sequence number of an RLC-PDU for which the STATUS-PDU (ACK) from an RLC sublayer of the receiving-side apparatus is expected in the RLC sublayer of the transmitting-side apparatus.

3. The window control and retransmission control method according to claim 1, wherein an upper limit value of the acknowledgement information reception window is the latest sequence number of an RLC-PDU transmitted to the MAC sublayer of the transmitting-side apparatus in the RLC sublayer of the transmitting-side apparatus.

4. A transmitting-side apparatus configured to perform window control processing and retransmission control processing of a packet on the basis of positive/negative acknowledgement information (STATUS-PDU) received from a receiving-side apparatus, comprising:

a radio link control (RLC) sublayer; and a medium access control (MAC) sublayer; wherein the RLC sublayer is configured to manage an acknowledgement information reception window;

the MAC sublayer is configured to transmit, to the RLC sublayer, a RLC-PDU including the STATUS-PDU received from the receiving-side apparatus, without performing a reordering processing for the RLC-PDU; and the RLC sublayer is configured to avoid an initiation of an RLC reset processing, by ignoring a sequence number of the RLC-PDU included in the STATUS-PDU received from the MAC sublayer, when the sequence number is a value outside a range of the acknowledgement information reception window.

5. The transmitting-side apparatus according to claim 4, wherein a lower limit value of the acknowledgement information reception window is the oldest sequence number of an RLC-PDU for which the STATUS-PDU (ACK) from an RLC sublayer of the receiving-side apparatus is expected in the RLC sublayer of the transmitting-side apparatus.

6. The transmitting-side apparatus according to claim 4, wherein an upper limit value of the acknowledgement information reception window is the latest sequence number of an RLC-PDU transmitted to the MAC sublayer of the transmitting-side apparatus in the RLC sublayer of the transmitting side apparatus.

* * * * *